US012752285B2

(12) United States Patent
Kim

(10) Patent No.: US 12,752,285 B2
(45) Date of Patent: Oct. 6, 2026

(54) INVERTER APPARATUS PROVIDED WITH DUST COLLECTING UNIT

(71) Applicant: LS ELECTRIC CO., LTD., Anyang-si (KR)

(72) Inventor: Kyu Hwa Kim, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 444 days.

(21) Appl. No.: 18/269,458

(22) PCT Filed: Nov. 25, 2021

(86) PCT No.: PCT/KR2021/017488
§ 371 (c)(1),
(2) Date: Jun. 23, 2023

(87) PCT Pub. No.: WO2022/145736
PCT Pub. Date: Jul. 7, 2022

(65) Prior Publication Data

US 2024/0042459 A1 Feb. 8, 2024

(30) Foreign Application Priority Data

Dec. 28, 2020 (KR) ........................ 10-2020-0184450

(51) Int. Cl.
*B03C 3/38* (2006.01)
*B03C 3/45* (2006.01)
(Continued)

(52) U.S. Cl.
CPC .................. *B03C 3/38* (2013.01); *B03C 3/45* (2013.01); *B03C 3/66* (2013.01); *B03C 3/88* (2013.01); *H02M 7/003* (2013.01)

(58) Field of Classification Search
CPC .... B03C 3/38; B03C 3/45; B03C 3/66; B03C 3/88; B03C 3/361; B03C 3/368;
(Continued)

(56) References Cited

U.S. PATENT DOCUMENTS 4,352,681 A * 10/1982 Dietz ..................... B01D 45/12 96/61
4,505,723 A * 3/1985 Zahedi ...................... B03C 3/70 55/479
(Continued)

FOREIGN PATENT DOCUMENTS

CN 1990115 A 7/2007
CN 104271248 A 1/2015
(Continued)

OTHER PUBLICATIONS

International Search Report for related International Application No. PCT/KR2021/017488; action dated Jul. 7, 2023; (3 pages).
(Continued)

*Primary Examiner* — Dung H Bui
(74) *Attorney, Agent, or Firm* — K&L Gates LLP

(57) ABSTRACT

Provided is an inverter apparatus provided with a dust collecting unit. The inverter apparatus provided with the dust collecting unit according to an exemplary embodiment of the present disclosure comprises: a housing having an air inlet port formed on one surface and an air discharge port formed on the other surface; an electrical element for inverter, which is arranged in the housing; a first suction member arranged in the housing; and the dust collecting unit arranged on one side of the air inlet port.

13 Claims, 8 Drawing Sheets

(51) Int. Cl.
*B03C 3/66* (2006.01)
*B03C 3/88* (2006.01)
*H02M 7/00* (2006.01)

(58) Field of Classification Search
CPC ....... B03C 2201/08; B03C 3/017; B03C 3/41; B03C 3/49; B03C 3/34; B03C 3/885; H02M 7/003; H02M 1/32; B04C 5/185
See application file for complete search history.

(56) References Cited

U.S. PATENT DOCUMENTS

| | | | | | |
|---|---|---|---|---|---|
| 4,689,951 | A * | 9/1987 | Polach | F01N 3/01 60/275 |
| 5,758,495 | A * | 6/1998 | Serra | F01N 3/0892 60/275 |
| 6,905,577 | B1 * | 6/2005 | Salama | B01D 53/32 204/164 |
| 7,597,750 | B1 * | 10/2009 | Krigmont | B03C 3/08 96/49 |
| 2006/0278082 | A1 * | 12/2006 | Tomimatsu | B03C 3/51 96/97 |
| 2007/0157814 | A1 * | 7/2007 | Kim | A47L 9/1666 96/61 |
| 2007/0245898 | A1 * | 10/2007 | Naito | B01D 53/32 96/65 |
| 2011/0047976 | A1 * | 3/2011 | Tokuda | F01N 3/01 60/275 |
| 2015/0113959 | A1 * | 4/2015 | Mitani | F01N 3/021 60/275 |
| 2015/0122123 | A1 * | 5/2015 | Segawa | B03C 3/06 96/60 |
| 2020/0055058 | A1 * | 2/2020 | Alam | B03C 3/64 |
| 2021/0394116 | A1 * | 12/2021 | Mast | G06F 21/62 |
| 2022/0016307 | A1 * | 1/2022 | Ahn | A61L 9/22 |
| 2024/0042459 | A1 * | 2/2024 | Kim | H02M 7/003 |

FOREIGN PATENT DOCUMENTS

| | | | |
|---|---|---|---|
| CN | 204911783 | U | 12/2015 |
| CN | 206559808 | U | 10/2017 |
| CN | 110201795 | A | 6/2019 |
| CN | 209608554 | U | 11/2019 |
| CN | 111602306 | A | 8/2020 |
| CN | 211838483 | U | 11/2020 |
| JP | 20000246060 | A | 9/2000 |
| JP | 2010022949 | A | 2/2010 |
| JP | 2016217298 | A | 12/2016 |
| JP | 2019199110 | A | 11/2019 |
| KR | 101160675 | B1 | 6/2012 |
| KR | 1020130087566 | | 8/2013 |
| KR | 102033875 | | 11/2019 |
| KR | 1020200138141 | A | 12/2020 |

OTHER PUBLICATIONS

Written Opinion for related International Application No. PCT/KR2021/017488; action dated Jul. 7, 2023; (3 pages).
Office Action for related Chinese Application No. 2021800878118; action dated Jul. 11, 2025; (3 pages).
Min, et al.; "Operation Mode of High Frequency Power Supply in Lower Temperature Electric Dust Removal"; China Academic Journal Electronic Publishing House; 2020; (4 pages).
Office Action for related Chinese Application No. 202180087811.8; action dated Mar. 5, 2026; (8 pages).

* cited by examiner

INVERTER APPARATUS PROVIDED WITH DUST COLLECTING UNIT

CROSS-REFERENCE TO RELATED APPLICATION

This application is a National Stage of International Application No. PCT/KR2021/017488, filed on Nov. 25, 2021, which claims priority to and the benefit of Korean Patent Application No. 10-2020-0184450, filed on Dec. 28, 2020, the disclosure of which is incorporated herein by reference in its entirety.

FIELD

The present disclosure relates to an inverter apparatus, and more specifically to an inverter apparatus provided with a dust collecting unit for removing dust contained in air which is used for cooling an electric element for an inverter.

BACKGROUND

In general, the inverter is a stationary power converter that electrically converts direct current (DC) into alternating current (AC), and it is also referred to as an inverse converter. Conversely, there is a converter or rectifier as a device for converting alternating current (AC) into direct current (DC).

Recently, there is a tendency to include a converter function that converts alternating current into direct current and an inverter function that converts direct current into alternating current within an invert.

Inverter elements such as a power module for supplying power to change power, a filter unit for rectifying function, a capacitor unit for power storage function and a control unit for control are disposed inside the inverter.

While the inverter is operating, a considerable amount of heat is generated in these inverter elements, and thus, an air-cooled cooling structure is used to dissipate this heat in the case of a general inverter.

That is, an air inlet port and an air discharge port are provided on one side and the other side of a housing in which inverter elements are disposed inside, and outside air flows into the housing through the air inlet port by using a fan to cool the inverter elements.

In this case, since the outside air contains dust, there is a problem in that the dust accumulates inside the inverter housing and causes a failure of the inverter.

Generally, a grill is disposed on the side of the air inlet port to prevent foreign substances that may interfere with the operation of the fan from flowing in, but such a grill has a limitation in that it is difficult to prevent fine dust from flowing into the inverter housing.

In addition, when a filter is installed on the air inlet port side to remove fine dust, there is a limitation in that the cooling efficiency is reduced because it is difficult to smoothly flow the air.

Accordingly, there is a need for an inverter apparatus which is capable of preventing fine dust from flowing into the inverter housing.

SUMMARY

An object of the present disclosure is to provide an inverter apparatus provided with a dust collecting unit to prevent fine dust from flowing into the housing.

An object of the present disclosure is to provide an inverter apparatus provided with a dust collecting unit which is capable of collecting dust attracted by the dust collecting unit and preventing the attracted dust from flowing into the housing again.

The problems of the present disclosure are not limited to the aforementioned problems, and other problems that are not mentioned will be clearly understood by those skilled in the art from the description below.

In order to solve the above problems, the inverter apparatus provided with a dust collecting unit may include a housing having an air inlet port formed on one surface and an air discharge port formed on the other surface; an electrical element for inverter, which is arranged in the housing; a first suction member which is disposed inside the housing to allow outside air to flow into the housing through the air inlet port and generate a flow of air discharged through the air discharge port to cool the electrical element; and a dust collecting unit which is disposed on one side of the air inlet port to remove dust included in the air flowing into the air inlet port, wherein the dust collecting unit may include a first discharge electrode which is negatively charged; a dust collection electrode which is spaced apart from the first discharge electrode and positively charged; an air flow guide which is formed to extend downward from a periphery of the air inlet port such that the outside air flows into the air inlet port via the first discharge electrode and the dust collection electrode; and a dust tray which is disposed below the dust collection electrode to collect the dust attracted to the dust collection electrode.

In this case, the inverter apparatus may further include a power supply unit for supplying power to the dust collecting unit, wherein the first discharge electrode is connected to a negative terminal of the power supply unit, and wherein the dust collection electrode is connected to a positive terminal of the power supply unit.

In this case, the power supply unit may be connected to the electric element for an inverter and the first suction member to supply power to the electric element for an inverter and the first suction member.

In this case, the first discharge electrode may be formed to extend in the extension direction of the air flow guide, and wherein the dust collection electrode may be spaced apart from a side surface of the first discharge electrode and is disposed on the inner peripheral surface of the air flow guide.

In this case, the inverter apparatus may further include at least one second discharge electrode which is electrically connected to the first discharge electrode and extends in a radial direction from a side surface of the first discharge electrode.

In this case, the inverter apparatus may further include at least one third discharge electrode which is electrically connected to the second discharge electrode, formed in a ring shape and supported by the second discharge electrode.

In this case, the dust tray may be formed to extend from a lower edge of the air flow guide to the upper side such that a space in which the dust is collected is formed on the inner peripheral side of the lower end of the air flow guide.

In this case, the first discharge electrode and the dust collection electrode may be disposed in the central portion of the air flow guide in the longitudinal direction, and wherein the air flow guide may be formed such that the cross-sectional area becomes wider from the central portion to both ends.

In this case, the inverter apparatus may further include a dust capturing unit which is connected to the dust tray to collect the dust collected in the dust tray.

In this case, the dust capturing unit may include a dust container in which the dust is collected; a dust discharge pipe which connects the dust container and the dust tray to be in fluid communication with each other; and a second suction member which forms a flow to move the dust from the dust tray to the dust container.

In this case, the inverter apparatus may further include a centrifugal separation member which is provided at one end of the dust discharge pipe to connect the dust discharge pipe and the dust container in order to separate dust from the air discharged from the dust discharge pipe and collect the dust into the dust container.

In this case, the centrifugal separation member may be provided with a cylindrical body, an air discharge port which is formed on an upper surface of the body and connected to the second suction member, a dust outlet port which is formed on a lower surface of the body and connected to the dust container, and a dust inlet port which is formed on a side surface of the body to be connected to the dust discharge pipe, and wherein the dust discharge pipe may be connected to the dust inlet port such that the direction from the dust inlet port to the center of the body and the direction in which the dust is discharged have a predetermined angle such that the discharged dust rotates along the inner peripheral surface of the body.

In this case, the cross-sectional area of the lower part of the body may become smaller toward the lower side.

The inverter apparatus provided with a dust collecting unit according to an exemplary embodiment of the present disclosure may remove dust included in the air which flows in from the outside to cool elements disposed inside the housing.

In the inverter apparatus provided with a dust collecting unit according to an exemplary embodiment of the present disclosure, the durability of the inverter apparatus can be improved by preventing dust from flowing into the inside of the inverter apparatus.

In addition, the inverter apparatus provided with a dust collecting unit according to an exemplary embodiment of the present disclosure can improve cooling efficiency by cooling electric elements whose temperature has increased by using the air from which dust has been removed.

The effects of the present disclosure are not limited to the above effects, and it should be understood to include all effects that can be inferred from the description of the present disclosure or the configuration of the disclosure described in the claims.

DETAILED DESCRIPTION

Figure 1:
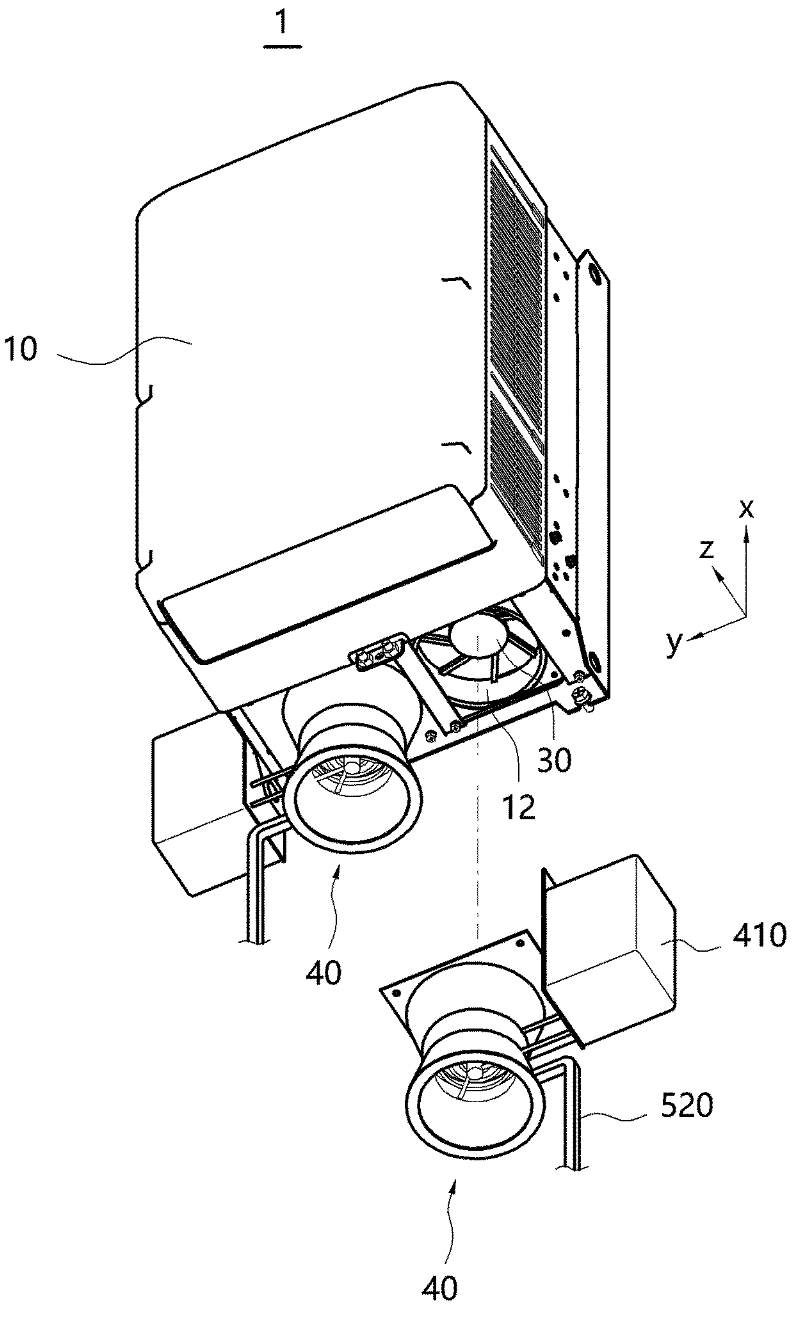
FIG. 1 is a perspective view of the inverter apparatus provided with a dust collecting unit according to an exemplary embodiment of the present disclosure as viewed from one direction.

Hereinafter, with reference to the accompanying drawings, exemplary embodiments of the present disclosure will be described in detail so that those of ordinary skill in the art can easily practice the present disclosure. The present disclosure may be embodied in many different forms and is not limited to the exemplary embodiments described herein.

In order to clearly describe the present disclosure in the drawings, parts that are irrelevant to the description are omitted, and the same reference numerals are assigned to the same or similar components throughout the specification. In order to clearly express the characteristics of the configuration in the drawings, the thickness or size is exaggerated, and the thickness or size of the configuration shown in the drawings is not shown as in reality. Hereinafter, it will be described by defining the X-axis direction of FIG. 1 as the upward direction, defining the Y-axis direction as the right direction, and defining the Z-axis direction as the forward direction. Accordingly, the direction opposite to the X-axis direction is defined as the downward direction, the direction opposite to the Y-axis direction is defined as the left direction, and the direction opposite to the Z-axis direction is defined as the rear direction.

The present disclosure provides an inverter apparatus which is capable of removing dust contained in outside air before the outside air flows into a housing, as an inverter apparatus having a cooling structure for circulating the outside air into the housing to cool electrical elements for an inverter which are disposed inside the housing.

Figure 2:
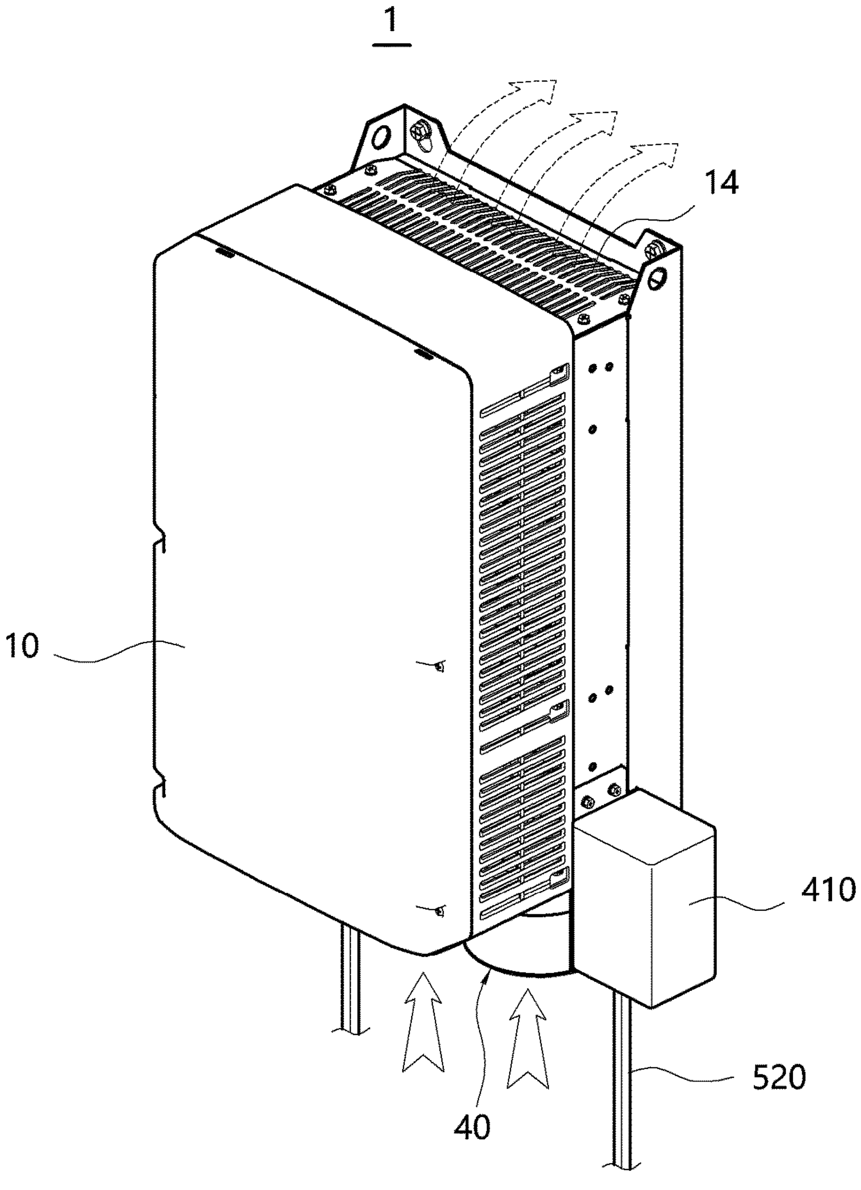
FIG. 2 is a perspective view of the inverter apparatus provided with a dust collecting unit according to an exemplary embodiment of the present disclosure as viewed from another direction.

FIG. 1 is a perspective view of the inverter apparatus provided with a dust collecting unit according to an exemplary embodiment of the present disclosure as viewed from one direction, and FIG. 2 is a perspective view of the inverter apparatus provided with a dust collecting unit according to an exemplary embodiment of the present disclosure as viewed from another direction.

Referring to FIG. 1, the inverter apparatus 1 provided with a dust collecting unit according to an exemplary embodiment of the present disclosure includes a housing 10, an electric element for an inverter (not illustrated), a first suction member 30 and a dust collecting unit 40.

The housing 10 is a component for protecting the components constituting the inverter therein, and the shape thereof is not limited. As an example, the housing may be formed in a box shape as illustrated in FIG. 1.

Electrical elements (not illustrated) for an inverter are disposed inside the housing 10. The electric elements for an inverter (not illustrated) are configurations which are necessary to electrically convert direct current (DC) into alternating current (AC) by the operation of the inverter apparatus 1, and for example, the electric element for an inverter (not illustrated) may be a capacitor, a coil or the like, but the present disclosure is not limited thereto.

During the operation of the inverter apparatus 1, heat is generated in the electric element for an inverter (not illustrated). In this way, the outside air is used to cool the heat generated by the electric element for an inverter (not illustrated).

To this end, as illustrated in FIGS. 1 and 2, an air inlet port 12 is formed at the lower side of the housing 10 to introduce outside air. The air introduced through the air inlet port 12 cools the electric element for an inverter (not illustrated), and the air which has cooled the electric element for an inverter (not illustrated) is discharged through the air discharge port 14 which is formed at the upper side of the housing 10.

In this case, as illustrated in FIG. 1, the inverter apparatus 1 provided with a dust collecting unit according to an exemplary embodiment of the present disclosure may include a first suction member 30.

The first suction member 30 generates a flow of air through which the outside air flows into the housing 10 through the air inlet port 12 and discharged back to the air discharge port 14.

The first suction member 30 is a configuration for creating a flow of air, and for example, it may be a fan, but the present disclosure is not limited thereto.

The first suction member 30 introduces outside air having a relatively low temperature through the air inlet port 12 and receives heat while the introduced air passes through the electric element for an inverter (not illustrated). The first suction member 30 continuously supplies cold air from the outside to the inside such that the heated air inside the housing 10 is discharged to the outside through the air discharge port 14. Accordingly, the first suction member 30 allows the air to continuously transfer the heat inside the inverter apparatus 1 to the outside.

In this case, as the first suction member 30 continuously circulates the air, the dust 2 contained in the air is also introduced into the housing 10 together. The dust 2 introduced in this way is accumulated inside the housing 10 and not only reduces the cooling efficiency of the electric element for an inverter (not illustrated), but also causes a malfunction of the inverter apparatus 1.

Accordingly, as illustrated in FIG. 1, a dust collecting unit 40 is disposed below the air inlet port 12 to remove the dust 2 contained in the outside air which flows into the air inlet port 12.

The dust collecting unit 40 removes the dust 2 flowing in from the outside by charging the same with a negative charge, and hereinafter, this will be described in detail with reference to FIGS. 3 to 6.

Figure 3:
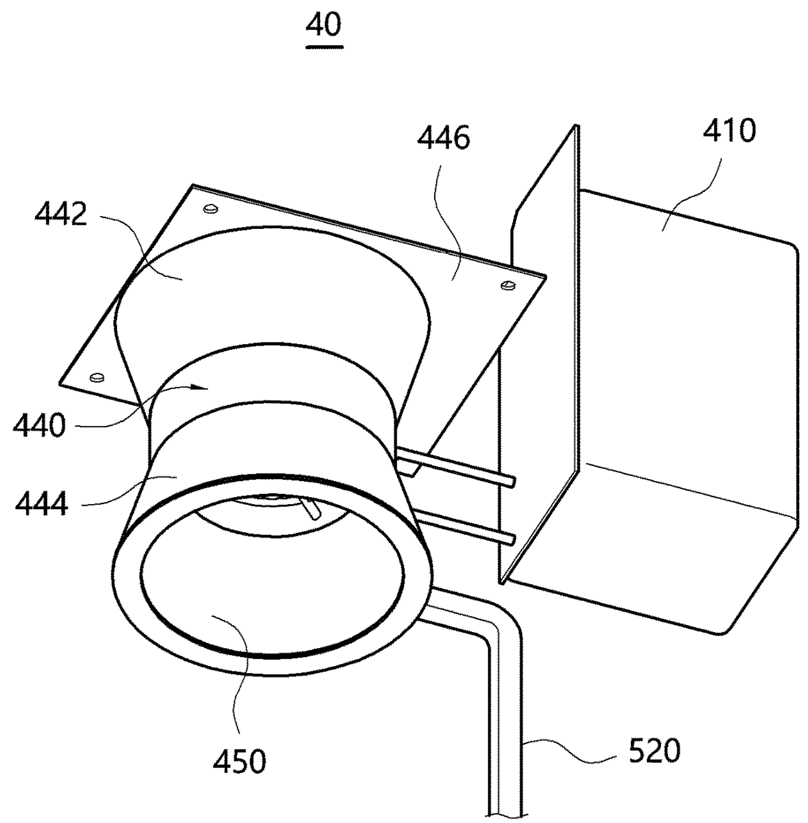
FIG. 3 is a perspective view of the dust collecting unit of the inverter apparatus provided with a dust collecting unit according to an exemplary embodiment of the present disclosure.
Figure 4:
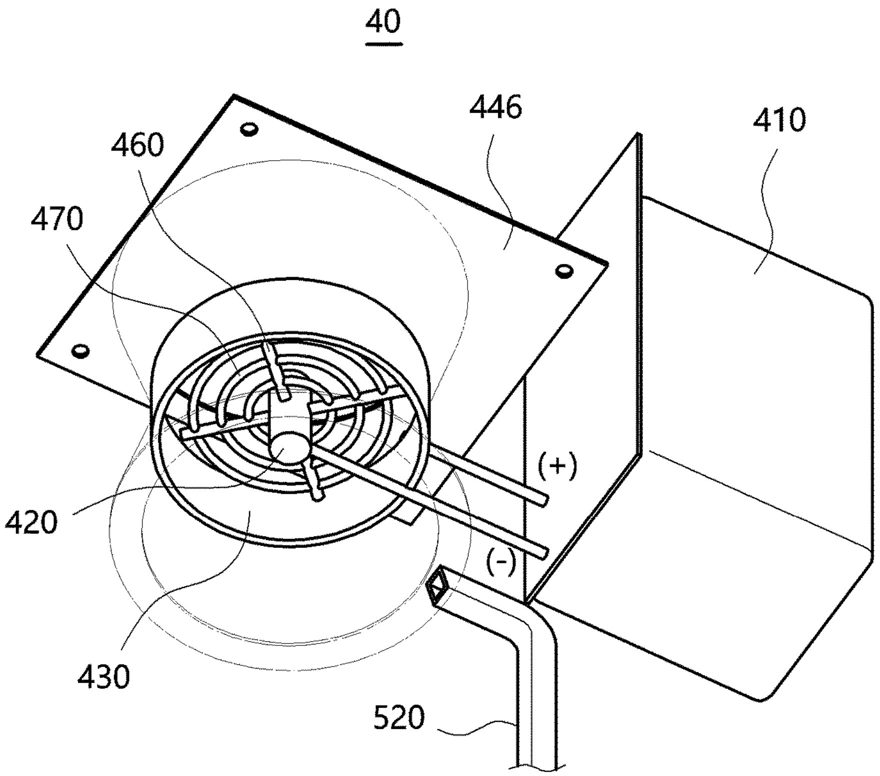
FIG. 4 is a perspective view in which the air flow guide of the dust collecting unit of the inverter apparatus provided with a dust collecting unit according to an exemplary embodiment of the present disclosure is removed.
Figure 5:
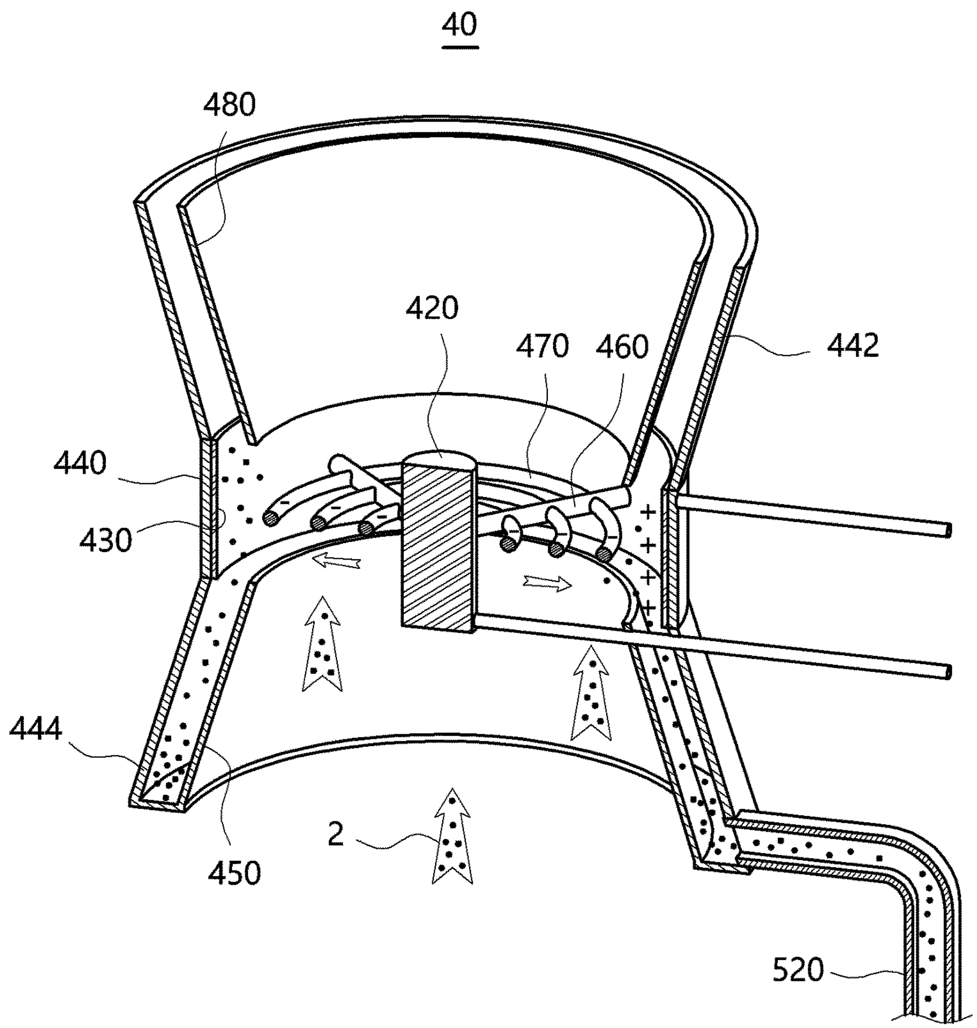
FIG. 5 is a cross-sectional view of the dust collecting unit of the inverter apparatus provided with a dust collecting unit according to an exemplary embodiment of the present disclosure.
Figure 6:
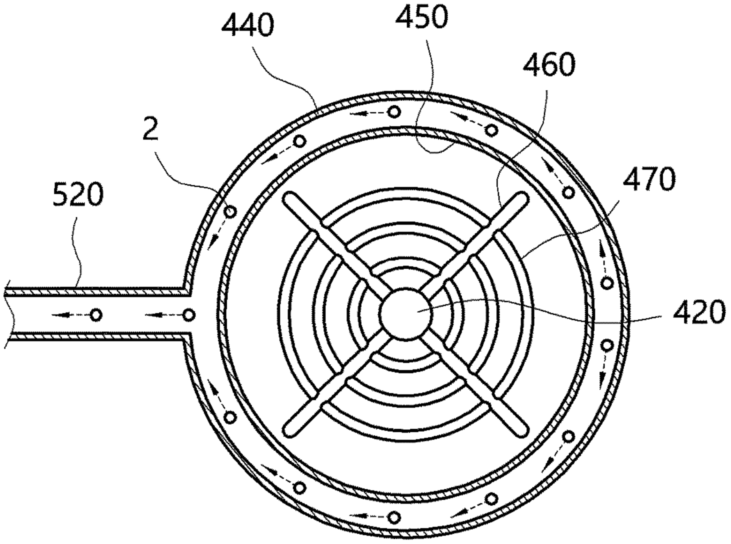
FIG. 6 is a bottom view of the dust collecting unit of the inverter apparatus provided with a dust collecting unit according to an exemplary embodiment of the present disclosure.

FIG. 3 is a perspective view of the dust collecting unit of the inverter apparatus provided with a dust collecting unit according to an exemplary embodiment of the present disclosure, FIG. 4 is a perspective view in which the air flow guide of the dust collecting unit of the inverter apparatus provided with a dust collecting unit according to an exemplary embodiment of the present disclosure is removed, FIG. 5 is a cross-sectional view of the dust collecting unit of the inverter apparatus provided with a dust collecting unit according to an exemplary embodiment of the present disclosure, and FIG. 6 is a bottom view of the dust collecting unit of the inverter apparatus provided with a dust collecting unit according to an exemplary embodiment of the present disclosure.

Referring to FIGS. 3 and 4, the dust collecting unit 40 of the inverter apparatus 1 provided with a dust collecting unit according to an exemplary embodiment of the present disclosure includes a power supply unit 410, a first discharge electrode 420, a dust collection electrode 430, an air flow guide 440 and a dust tray 450.

The power supply unit 410 supplies power to the dust collecting unit 40 such that the dust collecting unit 40 collects the dust 2 by using electric power.

The power supply unit 410 is a configuration for supplying power to the dust collecting unit 40, and for example, it may be a battery. The type of the power supply unit 410 is not limited, and if it is a configuration capable of supplying power to the dust collecting unit 40, various known products may be applied. In addition, the power supply unit 410 may be integrally formed with a power supply device (not illustrated) for supplying power to the inverter apparatus 1.

The first discharge electrode 420 is made of a conductor to conduct electricity with the power supply unit 410 and is connected to the negative pole of the power supply unit 410. Accordingly, as illustrated in FIG. 5, negative charges are disposed on the surface of the first discharge electrode 420.

The first discharge electrode 420 is disposed below the air inlet port 12 such that the air introduced into the air inlet port 12 can pass therethrough. Accordingly, when the dust 2 in the air contacts the surface of the first discharge electrode 420, it is charged with a negative charge.

In this case, as illustrated in FIG. 4, the first discharge electrode 420 is preferably disposed on the lower side from the center of the opening surface of the air inlet port 12 because it is possible for the air introduced through the air inlet port 12 and the first discharge electrode 420 to be in contact with each other as much as possible.

The shape of the first discharge electrode 420 is not limited. However, as illustrated in FIG. 4, it is preferable that in order not to disturb the flow of air, the length is extended in the direction in which the air flows, that is, in the upward direction, and the cross-section is formed in a circular shape.

The dust collection electrode 430 is made of a conductor to conduct electricity with the power supply unit 410 similar the first discharge electrode 420, and it is connected to the positive pole of the power supply unit 410 to attract negatively charged dust. Accordingly, positive charges are disposed on the surface of the dust collection electrode 430 as illustrated in FIG. 5.

Accordingly, the dust 2 which is charged with a negative charge by the first discharge electrode 420 receives an electric force to the dust collection electrode 430.

In this case, the dust collection electrode 430 is spaced apart from the side surface of the first discharge electrode 420. Accordingly, as illustrated in FIG. 5, the dust 2 is attracted from the first discharge electrode 420 toward the dust collection electrode 430.

In order for the dust collection electrode 430 to effectively attract the dust 2 charged from the first discharge electrode 420, as illustrated in FIG. 4, it is preferable to be formed to surround the first discharge electrode 420 while being spaced apart from the side surface of the first discharge electrode 420.

In this case, it is preferable that the length of the dust collection electrode 430 in the vertical direction is equal to or greater than the extended length of the first discharge electrode 420.

Meanwhile, an air flow guide 440 is disposed on the lower side of the air inlet port 12 such that the outside air which is sucked by the first suction member must pass through the first discharge electrode 420 and the dust collection electrode 430 to flow into the air inlet port 12 (refer to FIG. 1).

As illustrated in FIG. 3, the air flow guide 440 extends from the periphery of the air inlet port 12 to the lower side and is formed in a cylindrical shape. Accordingly, the outside air moves along the air flow guide 440, comes into contact with the first discharge electrode 420 and the dust collection electrode 430, and then flows into the housing 10 through the air inlet port 12.

In this case, the cross-sectional shape of the air flow guide 440 may be formed in a circular shape as illustrated in FIG. 3, but the present disclosure is not limited thereto, and it may be formed in various shapes such as a triangle or a square.

In this case, as illustrated in FIG. 4, a dust collecting pole 430 is disposed at the central portion in the longitudinal direction of the air flow guide 440 such that the outer peripheral surface of the dust collecting pole 430 comes into contact with the inner peripheral surface of the air flow guide 440.

The air flow guide 440 is preferably formed of an insulator so as not to conduct electricity with the first discharge electrode 420 and the dust collection electrode 430. Through this, not only can the dust 2 be prevented from being guided to unexpected places, but also the risk of an accident in which the user is energized through the air flow guide 440 can be prevented.

Meanwhile, as illustrated in FIG. 3, the lower end 444 of the air flow guide 440 is preferably formed to have a wider cross-sectional area toward the lower side. Accordingly, a large amount of outside air may be sucked, and the sucked outside air may be guided to the first discharge electrode 420 and the dust collection electrode 430. Accordingly, since the probability that the dust 2 contained in the air contacts the first discharge electrode 420 and is charged can be increased, the dust removal rate of the dust collecting unit 40 may be further increased.

In this case, as illustrated in FIG. 3, the upper end 442 of the air flow guide 440 is preferably formed to have a larger cross-sectional area toward the upper side. This is to match the cross-sectional area of the air flow concentrated in the first discharge electrode 420 and the dust collection electrode 430 to the size of the air inlet port 12.

Therefore, it is preferable that the cross-sectional area of the upper end 442 of the air flow guide 440 is formed to be the same as the cross-sectional area of the air inlet port 12. There is no limitation on the structure in which the air flow guide 440 is coupled to the air inlet port 12. For example, as illustrated in FIG. 3, a plate member 446 may be formed on the upper end of the air flow guide 440, and the plate member 446 may be coupled to the lower surface of the housing 10 with screws.

In this case, a dust tray 450 is disposed on the inner peripheral surface of the lower end 444 of the air flow guide 440 in order to collect the dust 2 attracted to the inner peripheral surface of the dust collecting pole 430 by electric force (refer to FIG. 2).

When the dust 2 collected in the dust collecting pole 430 is moved in the direction of its own weight by gravity, the dust tray 450 is formed to extend from the lower edge of the air flow guide 440 toward the upper portion so as to collect the dust.

In more detail, as illustrated in FIG. 5, the dust tray 450 has an opening which is formed on the lower side of the dust collecting pole 430. In this case, the dust tray 450 is spaced apart from the inner surface of the lower end 444 of the air flow guide 440 so as to form a space in which the dust 2 introduced through the opening is collected and the lower side is closed. In this case, as illustrated in FIG. 5, the inner side surface of the air flow guide 440 of the dust tray 450 is preferably formed to be parallel to the air flow guide 440 such that the air may be guided along the inner side surface of the air flow guide 440 of the dust tray 450.

A blocking member 480 may be provided on the upper side of the dust collecting pole 430 in order to prevent the dust 2 attracted to the dust collecting pole 430 from flowing into the air inlet port 12 again by the first suction member 30.

As illustrated in FIG. 5, the blocking member 480 may be formed to be symmetrical with the dust tray 450. Accordingly, the flow of air may be disturbed at the upper side of the dust collecting pole 430, and the dust 2 which is attracted to the dust collecting pole 430 may not move to the air inlet port 12.

However, the shape of the blocking member 480 does not always have to be formed to be symmetrical with the dust receiving member 450, and if the air flow formed by the first suction member 30 at the upper side of the dust collecting pole 430 can be obstructed, there is no limitation in the exemplary embodiment. For example, although not illustrated in the drawings, it may be formed to protrude from the inner peripheral surface of the air flow guide 440 to the central axis in the longitudinal direction of the air flow guide 440 on the upper side of the dust collecting pole 430.

Meanwhile, referring to FIG. 4, the dust collecting unit 40 of the inverter apparatus 1 provided with dust collecting unit according to an exemplary embodiment of the present disclosure may include a second discharge electrode 460 and a third discharge electrode 470.

The second discharge electrode 460 charges the dust 2 together with the first discharge electrode 420 to a negative charge. The second discharge electrode 460 is provided to increase the contact area between the air and the discharge electrode such that the dust 2 is easily charged.

Accordingly, the second discharge electrode 460 is made of a conductor and is connected to conduct electricity with the first discharge electrode 420 such that negative charges are disposed on the surface of the second discharge electrode 460.

In order to expand the contact area that can charge the dust 2 contained in the air which is guided by the air flow guide 440 and introduced through the air inlet port 12, the second discharge electrode 460 is formed to extend radially from the side surface of the first discharge electrode 420. In this case, the tip of the second discharge electrode 460 in the extension direction is formed so as not to contact the dust collection electrode 430.

One or more second discharge electrodes 460 may be provided. However, as illustrated in FIG. 4, since the second discharge electrode 460 also serves to structurally support the third discharge electrode 470, which will be described below, four or more are preferably disposed.

In addition, when a plurality of second discharge electrodes 460 are provided, they are preferably disposed at equal intervals on the side surfaces of the first discharge electrodes 420 in order to firmly support the third discharge electrodes 470, which will be described below. That is, as illustrated in FIG. 6, the first discharge electrode 420 is preferably disposed symmetrically.

Similar to the second discharge electrode 460, the third discharge electrode 470 is provided to increase the contact area between the air and the discharge electrode such that the dust 2 is easily charged. Accordingly, the dust 2 is charged with a negative charge together with the first discharge electrode 420 and the second discharge electrode 460.

Accordingly, the third discharge electrode 470 is also made of a conductor and is connected to conduct electricity with the second discharge electrode 460 such that negative charges are disposed on the surface of the third discharge electrode 470.

As long as the third discharge electrode 470 is connected to the second discharge electrode 460 to increase the contact area of the dust 2, there is no limitation in the exemplary embodiment. However, it is preferably formed in a ring shape so as not to interfere with the flow of air introduced through the air flow guide 440 as much as possible, and it is preferably formed in a circular shape as illustrated in FIGS. 4 and 6.

In this case, it is preferable that the first discharge electrode 420 is disposed inside the air flow guide 440 at the center of the third discharge electrode 470, and the third discharge electrode 470 is structurally supported by the second discharge electrode 460.

As illustrated in FIG. 6, one or more third discharge electrodes 470 may be provided. The number of the third discharge electrodes 470 may be formed differently depending on the size of the inner cross-section of the air flow guide 440.

The third discharge electrode 470 may be injection-molded integrally with the second discharge electrode 460 and the first discharge electrode 420, or it may be integrally formed with the second discharge electrode 460 to be detachable from the first discharge electrode 420. In the case of being detachable, there is an advantage in that compatibility may be enhanced by replacing the second discharge electrode 460 and the third discharge electrode 470 with different shapes according to the shape of the air flow guide 440.

Figure 7:
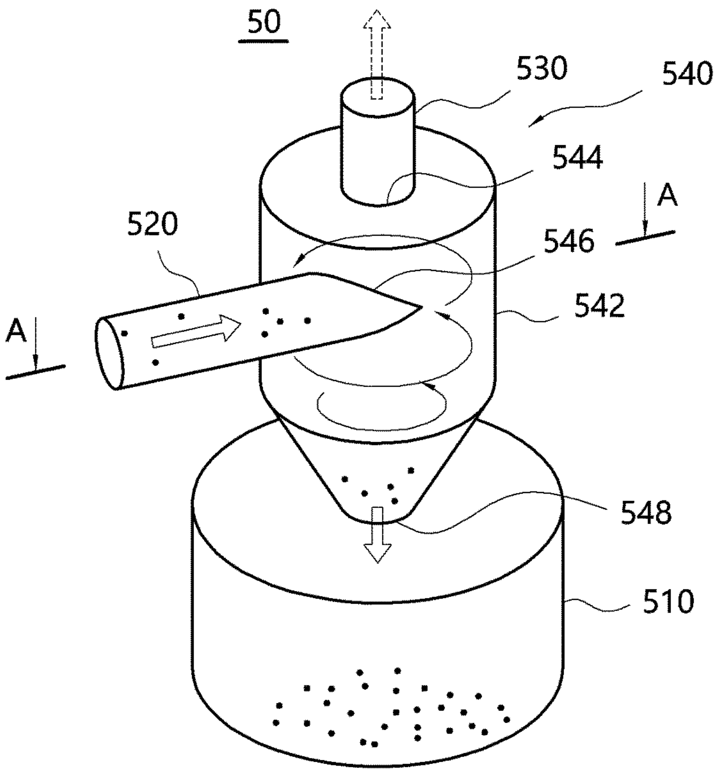
FIG. 7 is a perspective view of the dust capturing unit of the inverter apparatus provided with a dust collecting unit according to an exemplary embodiment of the present disclosure.
Figure 8:
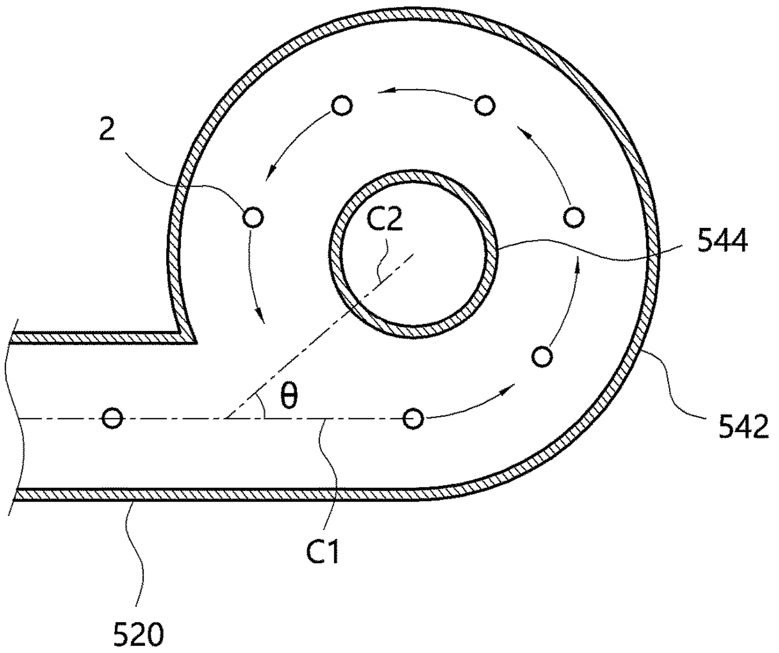
FIG. 8 is a cross-sectional view illustrating the dust capturing unit by enlarging a cross-section taken along the line A-A' of FIG. 7.

FIG. 7 is a perspective view of the dust capturing unit of the inverter apparatus provided with a dust collecting unit according to an exemplary embodiment of the present disclosure, and FIG. 8 is a cross-sectional view illustrating the dust capturing unit by enlarging a cross-section taken along the line A-A' of FIG. 7.

As illustrated in FIG. 7, the inverter apparatus 1 provided with a dust collecting unit according to an exemplary embodiment of the present disclosure may include a dust capturing unit 50.

The dust capturing unit 50 is connected to the dust tray 450 and removes the dust 2 collected inside the dust tray 450 by discharging the same to the outside of the dust tray 450.

Accordingly, even if the dust 2 is attracted by the dust collecting pole 430 and accumulated in the dust tray 450, the dust collecting unit 40 may be continuously operated by separating and discharging the dust 2 through the dust capturing unit 50.

In this case, as illustrated in FIG. 7, the dust capturing unit 50 may include a dust container 510, a dust discharge pipe 520, a second suction member 530 and a centrifugal separation member 540.

The dust container 510 is collected by moving the dust 2 collected in the dust receiving 450 therein.

There is no limitation on the position where the dust container 510 is disposed. For example, it may be disposed on the lower side of the housing 10 (refer to FIG. 1).

In this case, in order to move the dust 2, the dust container 510 and the dust tray 450 are connected to be in fluid communication through the dust discharge pipe 520.

The dust discharge pipe 520 may have a different length or shape depending on the location of the dust container 510.

In this case, as illustrated in FIG. 6, the second suction member 530 forms a flow such that the dust 2 collected inside the dust tray 450 moves along with the air to the dust container 510 through the dust discharge pipe 520.

The second suction member 530 is a configuration for forming an air flow, and for example, it may be a fan, but the present disclosure is not limited thereto.

Meanwhile, the dust discharge pipe 520 may be coupled to the dust container 510 by the centrifugal separation member 540, and the second suction member 530 may be coupled to the centrifugal separation member 540 such that an air flow is formed inside the dust discharge pipe 520.

The centrifugal separation member 540 separates only the dust 2 in the air discharged through the dust discharge pipe 520 and collects the same in the dust container 510. In this case, the air from which the dust 2 has been removed is discharged to the outside through the second suction member 530.

To this end, the centrifugal separation member 540 of the inverter apparatus 1 provided with a dust collecting unit according to an exemplary embodiment of the present disclosure may include a body 542, an air discharge port 544, a dust inlet port 546 and a dust discharge port 548.

As illustrated in FIG. 7, the body 542 of the centrifugal separation member 540 is formed in a cylindrical shape. In this case, the body 542 is preferably formed such that the cross-section becomes narrower toward the lower side.

As illustrated in FIG. 7, the dust inlet port 546 is formed on the side surface of the body 542, and the dust outlet pipe 520 is connected to the dust inlet port 546. Accordingly, the dust 2 inside the dust tray 450 flows into the body 542 of the centrifugal separation member 540 while being included in the air flow formed by the centrifugal separation member 540 through the dust discharge pipe 520.

In this case, as illustrated in FIG. 8, in the dust discharge pipe 520 connected to the dust inlet 546, the air flow direction C1 of the dust outlet 520 and the direction C2 from the dust inlet port 546 toward the center of the body 542 do not match, but are formed to have a predetermined angle θ.

Through this, the air introduced into the body 542 through the dust discharge pipe 520 rotates along the inner peripheral surface of the body 542. In this case, the dust 2 included in the air receives a centrifugal force, is separated from the air and continues to rotate along the inner peripheral surface of the body 542.

As illustrated in FIG. 7, the air discharge port 544 is formed on the upper surface of the body 542. The air flows through the dust inlet port 546 into the air discharge port 544, and the air separated from the dust 2 is discharged.

As illustrated in FIG. 7, the second suction member 530 is coupled to the air discharge port 544. The second suction member 530 forms a flow of air from the inside to the outside of the body 542 through the air discharge port 544 such that it allows the air to eventually pass from the dust tray 450 through the dust discharge pipe 520 and the body 542 to escape through the air discharge port 544.

In this case, the flow direction of the air separated from the dust 2 in the air discharge port 544 is preferably directed toward the air flow guide 440.

Meanwhile, as illustrated in FIG. 7 on the lower end surface of the body 542, the dust discharge port 548 is formed. When the air separated from the dust 2 is discharged through the air discharge port 544, the dust 2 remaining inside the body 542 moves downward by receiving gravity.

In this case, since the cross-section of the lower end of the body 542 becomes narrower toward the lower side, the dust 2 moves to the dust discharge port 548 while performing a spiral motion along the inner peripheral surface of the body 542.

In this case, the dust container 510 is detachably coupled to the dust outlet 548, and the dust 2 discharged to the dust discharge port 548 is collected in the dust container 510.

Accordingly, the user may easily manage the dust collecting unit 40 by separating only the dust container 510 and removing the dust 2 collected inside the dust container 510.

In the above, the inverter apparatus provided with a dust collecting unit according to an exemplary embodiment of the present disclosure has been described, but the dust collecting unit of the inverter apparatus according to the present exemplary embodiment is not applicable only to the inverter apparatus, and it will be clearly understood by those skilled in the art to which the present disclosure pertains that it can be applied to various fields of electronic devices that flow the air into the housing.

As described above, preferred exemplary embodiments according to the present disclosure have been reviewed, and the fact that the present disclosure can be embodied in other specific forms without departing from the spirit or scope of the present disclosure other than the above-described exemplary embodiments will be apparent to those of ordinary skill in the art. Therefore, the above-described exemplary embodiments are to be regarded as illustrative rather than restrictive, and accordingly, the present disclosure is not limited to the above description, but may be modified within the scope of the appended claims and their equivalents.

The invention claimed is:

1. An inverter apparatus provided with a dust collecting unit, comprising:
- a housing having an air inlet port formed on a lower side of a first surface and an air discharge port formed on an upper side of a second surface;
- an electrical element for an inverter, which is arranged in the housing;
- a first suction member which is disposed inside the housing to allow outside air to flow into the housing through the air inlet port and generate a flow of air discharged through the air discharge port to cool the electrical element; and
- a dust collecting unit which is disposed below the air inlet port to remove dust included in the air flowing into the air inlet port,
- wherein the dust collecting unit comprises:
  - a first discharge electrode which is negatively charged;
  - a dust collection electrode which is spaced apart from the first discharge electrode and positively charged;
  - an air flow guide which is formed to extend downward from a periphery of the air inlet port such that the outside air flows past the first discharge electrode and the dust collection electrode before entering the air inlet port; and
  - a dust tray which is disposed below the dust collection electrode to collect the dust attracted to the dust collection electrode,
- wherein the air flow guide has a circular cross-sectional shape,
- wherein the first discharge electrode is disposed along a central axis of the air flow guide, and the dust collection electrode is disposed along an inner peripheral surface of the air flow guide so as to surround the first discharge electrode,
- wherein the outside air flowing from the lower side of the housing to the upper side of the housing is introduced into an interior of the housing after passing through the dust collecting unit and the air inlet port, and flows upward to be discharged to an exterior of the housing through the air discharge port.

2. The inverter apparatus of claim 1, further comprising:
- a power supply unit for supplying power to the dust collecting unit,
- wherein the first discharge electrode is connected to a negative terminal of the power supply unit, and
- wherein the dust collection electrode is connected to a positive terminal of the power supply unit.

3. The inverter apparatus of claim 2, wherein the power supply unit is connected to the electrical element for the inverter and the first suction member to supply power to the electrical element for the inverter and the first suction member.

4. The inverter apparatus of claim 1, wherein the first discharge electrode is formed to extend in an extension direction of the air flow guide, and
- wherein the dust collection electrode is spaced apart from a side surface of the first discharge electrode and is disposed on an inner peripheral surface of the air flow guide.

5. The inverter apparatus of claim 4, further comprising:
- a second discharge electrode which is electrically connected to the first discharge electrode and extends in a radial direction from a side surface of the first discharge electrode.

6. The inverter apparatus of claim 5, further comprising:
- a third discharge electrode which is electrically connected to the second discharge electrode, formed in a ring shape and supported by the second discharge electrode.

7. The inverter apparatus of claim 4, wherein the dust tray is formed to extend from a lower edge of the air flow guide to the upper side of the second surface such that a space in which the dust is collected is formed on an inner peripheral side of the lower edge of the air flow guide.

8. The inverter apparatus of claim 1, wherein the first discharge electrode and the dust collection electrode are disposed in a central portion of the air flow guide in a longitudinal direction, and
- wherein the air flow guide is formed such that a cross-sectional area becomes wider from the central portion to both ends.

9. The inverter apparatus of claim 1, further comprising:
- a dust capturing unit which is connected to the dust tray to collect the dust collected in the dust tray.

10. The inverter apparatus of claim 9, wherein the dust capturing unit comprises:
- a dust container in which the dust is collected;
- a dust discharge pipe which connects the dust container and the dust tray to be in fluid communication with each other; and
- a second suction member which forms a flow to move the dust from the dust tray to the dust container.

11. The inverter apparatus of claim 10, further comprising:
- a centrifugal separation member which is provided at one end of the dust discharge pipe to connect the dust discharge pipe and the dust container in order to separate dust from the air discharged from the dust discharge pipe and collect the dust into the dust container.

12. The inverter apparatus of claim 11, wherein the centrifugal separation member is provided with a cylindrical body, an air discharge port which is formed on an upper surface of the cylindrical body and connected to the second suction member, a dust outlet port which is formed on a lower surface of the cylindrical body and connected to the dust container, and a dust inlet port which is formed on a side surface of the cylindrical body to be connected to the dust discharge pipe, and wherein the dust discharge pipe is connected to the dust inlet port such that a first direction from the dust inlet port to a center of the cylindrical body and a second direction in which the dust is discharged have a predetermined angle relative to one another such that the discharged dust rotates along an inner peripheral surface of the cylindrical body.

13. The inverter apparatus of claim 12, wherein a cross-sectional area of a lower part of the body becomes smaller toward the lower side.

* * * * *